US012600814B2

(12) United States Patent
Huber et al.

(10) Patent No.: US 12,600,814 B2
(45) Date of Patent: *Apr. 14, 2026

(54) ELECTRIC INSULATION MATERIAL AND/OR IMPREGNATION RESIN FOR A WRAPPING TAPE INSULATION FOR A MEDIUM- AND/OR HIGH-VOLTAGE MACHINE

(71) Applicant: Innomotics GmbH, Nuremberg (DE)

(72) Inventors: Jürgen Huber, Erlangen (DE); Steffen Lang, Hallerndorf (DE); Michael Nagel, Gremsdorf (DE); Matthias Übler, Ursensollen (DE); Niels Müller, Nuremberg (DE)

(73) Assignee: INNOMOTICS GMBH, Nuremberg (DE)

( * ) Notice: Subject to any disclaimer, the term of this patent is extended or adjusted under 35 U.S.C. 154(b) by 360 days.

This patent is subject to a terminal disclaimer.

(21) Appl. No.: 16/645,590

(22) PCT Filed: Sep. 13, 2018

(86) PCT No.: PCT/EP2018/074752
§ 371 (c)(1),
(2) Date: Mar. 9, 2020

(87) PCT Pub. No.: WO2019/057601
PCT Pub. Date: Mar. 28, 2019

(65) Prior Publication Data
US 2021/0376681 A1 Dec. 2, 2021

(30) Foreign Application Priority Data

Sep. 20, 2017 (EP) .................................... 17192058

(51) Int. Cl.
C08G 59/30 (2006.01)
C08L 63/00 (2006.01)
C08L 83/04 (2006.01)
C09D 163/00 (2006.01)
H01B 3/40 (2006.01)
H02K 3/40 (2006.01)

(52) U.S. Cl.
CPC ........... C08G 59/306 (2013.01); C08L 63/00 (2013.01); C08L 83/04 (2013.01); C09D 163/00 (2013.01); H01B 3/40 (2013.01); H02K 3/40 (2013.01)

(58) Field of Classification Search
None
See application file for complete search history.

(56) References Cited

U.S. PATENT DOCUMENTS

| | | | | |
|---|---|---|---|---|
| 3,576,903 A | | 4/1971 | Groff | 525/423 |
| 4,082,719 A | | 4/1978 | Liles et al. | 260/37 |
| 4,400,676 A | | 8/1983 | Mitsui | 336/205 |
| 4,533,713 A | | 8/1985 | Howells | 528/26 |
| 5,064,574 A | * | 11/1991 | Oldham | C08K 5/098 |
| | | | | 524/80 |
| 2004/0249060 A1 | | 12/2004 | Hucke et al. | 524/589 |
| 2011/0011640 A1 | | 1/2011 | Cotton et al. | 174/521 |
| 2012/0182355 A1 | * | 7/2012 | Graham | B41J 2/0458 |
| | | | | 347/56 |
| 2013/0203882 A1 | * | 8/2013 | Cherkaoui | C09D 183/04 |
| | | | | 522/31 |
| 2014/0243453 A1 | * | 8/2014 | Mizumura | C08L 63/00 |
| | | | | 523/434 |
| 2017/0137668 A1 | | 5/2017 | Haase et al. | 428/391 |

FOREIGN PATENT DOCUMENTS

| | | | | |
|---|---|---|---|---|
| CN | 1455799 A | 11/2003 | | C08G 59/18 |
| CN | 101952357 A | 1/2011 | | C08K 3/24 |
| EP | 0 125 826 A2 | 11/1984 | | C07C 301/00 |
| EP | 1 981 150 A2 | 10/2008 | | H02K 3/50 |
| EP | 3 168 268 A1 | 5/2017 | | C09D 179/08 |
| JP | 5917218 A | 1/1984 | | H01B 17/60 |
| WO | 90/01518 A1 | 2/1990 | | B64G 1/50 |
| WO | 2011/138413 A2 | 11/2011 | | C08K 5/549 |
| WO | 2019/057601 A1 | 3/2019 | | C08L 63/00 |

OTHER PUBLICATIONS

Chinese Office Action, Application No. 201880061119.6, 17 pages, Sep. 3, 2021.
Extended European Search Report, Application No. 17192058.0, 7 pages, Mar. 6, 2018.
International Search Report and Written Opinion, Application No. PCT/EP2018/074752, 14 pages, Dec. 4, 2018.

* cited by examiner

Primary Examiner — Megan McCulley
(74) Attorney, Agent, or Firm — Slayden Grubert Beard PLLC

(57) ABSTRACT

Various embodiments include an insulation material and/or impregnation resin for a wrapping tape insulation, comprising: a base resin curing to a thermoset; and a curing agent. The base resin comprises a siloxane-containing compound forming a $—SiR_2—O—$ backbone in the thermoset.

9 Claims, 2 Drawing Sheets

ELECTRIC INSULATION MATERIAL AND/OR IMPREGNATION RESIN FOR A WRAPPING TAPE INSULATION FOR A MEDIUM- AND/OR HIGH-VOLTAGE MACHINE

CROSS-REFERENCE TO RELATED APPLICATIONS

This application is a U.S. National Stage Application of International Application No. PCT/EP2018/074752 filed Sep. 13, 2018, which designates the United States of America, and claims priority to EP Application No. 17192058.0 filed Sep. 20, 2017, the contents of which are hereby incorporated by reference in their entirety.

TECHNICAL FIELD

The present disclosure relates to electrical insulation and electrical machines. Various embodiments may include electrical insulation materials and/or impregnation resins for wrapping tape insulation and/or insulation systems, for example an insulation system for a rotating electrical machine, e.g. a medium- or high-voltage machine.

BACKGROUND

Electrical energy is typically generated using rotating high-voltage machines in the form of generators. EP 1 981 150 A2 describes a generator having a rotatable rotor, and a stator arranged around the rotor. The stator has a laminated core in a rotationally symmetric configuration, with electrically conductive winding bars running in grooves in the laminated core. The laminated core is adjoined by an end winding at either end, which connects the winding bars via connecting elements to form a complete winding.

In the operation of high-voltage machines with powers exceeding 500 MVA, rated voltages exceeding 10 kV can be attained. The components are correspondingly exposed to high mechanical, thermal and electrical stresses. The reliability of the insulation system of the electrical conductors is therefore crucially responsible for operational reliability. An insulation system has the task of insulating electrical conductors, such as wires, coils and winding bars, permanently from one another and from the laminated core of the stator or the environment. For this purpose, the insulation system has an insulation between subconductors (subconductor insulation), between the conductors or winding bars (conductor or winding insulation), and between the conductors and the ground potential in the groove region and end winding region (main insulation).

A fundamental problem with such electrically stressed insulations lies in the partial discharge-induced erosion with formation of "tea-ring" channels that ultimately lead to the electrical breakdown of the insulation. Typically, permanent insulation of the voltage-bearing conductors in rotating machines is implemented using mica-based insulations. The main insulation is formed by wrapping mica tapes around the preformed coils produced from insulated subconductors and impregnating them with a resin by a vacuum-pressure impregnation (VPI process). Mica tapes are used here in the form of mica paper.

The impregnation fills the cavities present between the individual particles and/or tape folds in the mica paper with the insulation material. The composite composed of impregnation resin and mica paper is cured and forms the insulant which is then processed in the insulation system and provides the mechanical stability of the insulation system. The electrical strength results from the multitude of solid-solid interfaces in the mica. The VPI process therefore has to fill even the smallest cavities in the insulation with resin in order to minimize the number of inner gas-solid interfaces.

Overall, this places extremely high electrical, thermal, and mechanical demands on the insulation of the conductors of a winding with respect to one another, the winding with respect to the laminated core, and the sliding arrangement formed at the exit of the conductors from the laminated core. In machine insulation, a distinction is drawn between internal potential control IPS between the copper conductor assembly and the high-voltage insulation, the exterior corona shielding (AGS), between the winding and the laminated core, and the end corona shielding (EGS) at the exit of the winding rods from the laminated core.

A conventional insulation system, an impregnated winding composed of mica tape with tape adhesive and tape accelerator, comprising a base resin, for example an epoxy resin and one or more curing agents, and optionally also epoxy-functionalized curing agents, has a thickness in the range of 0.5 to 6 mm. During the operation of the electrically rotating machine, electrical discharges arise over the course of time, which in turn attack the plastic in the insulation.

This destroys the plastic locally, resulting in electrical erosion phenomena. This destruction of the insulation system is delayed by the platelet form of the partial discharge-resistant mica in the insulation system by extending the erosion path length, such that a minimum lifetime of 20 years may be possible. Nevertheless, an erosion pathway through the insulation system forms constantly over the course of the lifetime until there is ultimately a ground fault in the electrically rotating machine. If the electrical field strength were to be raised from 3.5 kV/mm to 4.5 kV/mm, for example, the electrical erosion pathway would be formed earlier and, for example even after 5 years, would already lead to a ground fault and hence to total failure.

The thickness of the insulation system should in principle be chosen at the very minimum possible level to achieve high efficiencies of the machines. In order to increase the power density in the generator and electric motor, it is desirable to reduce the thickness of the insulation system, for example by about 20%. This inevitably leads to rising electrical field strengths in the insulation system from—again by way of example—3.5 kV/mm to 4.5 kV/mm and hence to elevated electrical partial discharge activity. The insulation systems in conventional use permit sustained operating field strengths of 3.5 kV/mm with a technically possible lifetime of at least 20 years.

Base resins used to date for electrical insulations and especially also as impregnating resins for wrapping tape insulations are preferably carbon-based epoxy resins which, in liquid form, bear all possible functional groups, for example including epoxy groups, on a carbon-based $(-CR_2-)_n-$ backbone. These are reacted with curing agent to give a thermoset that forms a potting compound and/or, for example, the impregnation of the wrapping tape insulation.

SUMMARY

The teachings of the present disclosure describe an approach for improving insulation systems for medium- and high-voltage machines by providing a novel and better insulation material, especially one more resistant to partial discharge. This is of great interest particularly because the reduction of the insulation system by 20% can save about 600 kg—for example in the case of a 370 MVA generator—of insulation material, such as plastic, mica and/or glass fiber.

For example, some embodiments include an insulation material and/or impregnation resin for a wrapping tape insulation, comprising at least a base resin, a curing agent and optionally additives, characterized in that at least some of the base resin that cures to give a thermoset for the insulation system is a siloxane-containing compound that forms a —SiR$_2$—O— backbone in the thermoset.

In some embodiments, the compounds in the base resin are in monomeric form.

In some embodiments, the compounds in the base resin are in oligomeric form.

In some embodiments, the base resin comprises a compound that forms a —SiR$_2$—O— backbone at least to an extent of 10 mol %, especially at least to an extent of 15 mol %.

In some embodiments, the curing agent comprises a siloxane-containing component that forms a —SiR$_2$—O— backbone that bears the corresponding functionalities suitable for curing of the base resin.

In some embodiments, compounds that form a —SiR$_2$—O— backbone are present in the base resin together with compounds that form a —CR$_2$— backbone in a stoichiometric ratio of 1:4 to 1:8.

In some embodiments, compounds that form a —CR$_2$— backbone are present in a greater molar percentage in the base resin than compounds that form a —SiR$_2$—O— backbone.

In some embodiments, a glycidyl- and/or glycidoxy-functionalized compound that forms a —SiR$_2$—O— backbone is present in the base resin.

In some embodiments, a glycidyl ether compound and/or a novolak derivative is present in the base resin.

In some embodiments, a cycloaliphatic epoxy resin is present in the base resin.

In some embodiments, an epoxy-terminated aryl- and/or alkylsiloxane is present in the base resin as compound that forms a —SiR$_2$—O— backbone.

In some embodiments, 1,3-bis(3-glycidyloxyalkyltetramethyldisiloxane) is present in the base resin as compound that forms a —SiR$_2$—O— backbone.

In some embodiments, 1,3-bis(3-glycidyloxypropyl)tetramethyldisiloxane is present in the base resin as compound that forms a —SiR$_2$—O— backbone.

As another example, some embodiments include an insulation system, especially for a medium- and/or high-voltage machine, comprising an insulant obtainable by curing an insulation material as described above.

DETAILED DESCRIPTION

Figure 1:
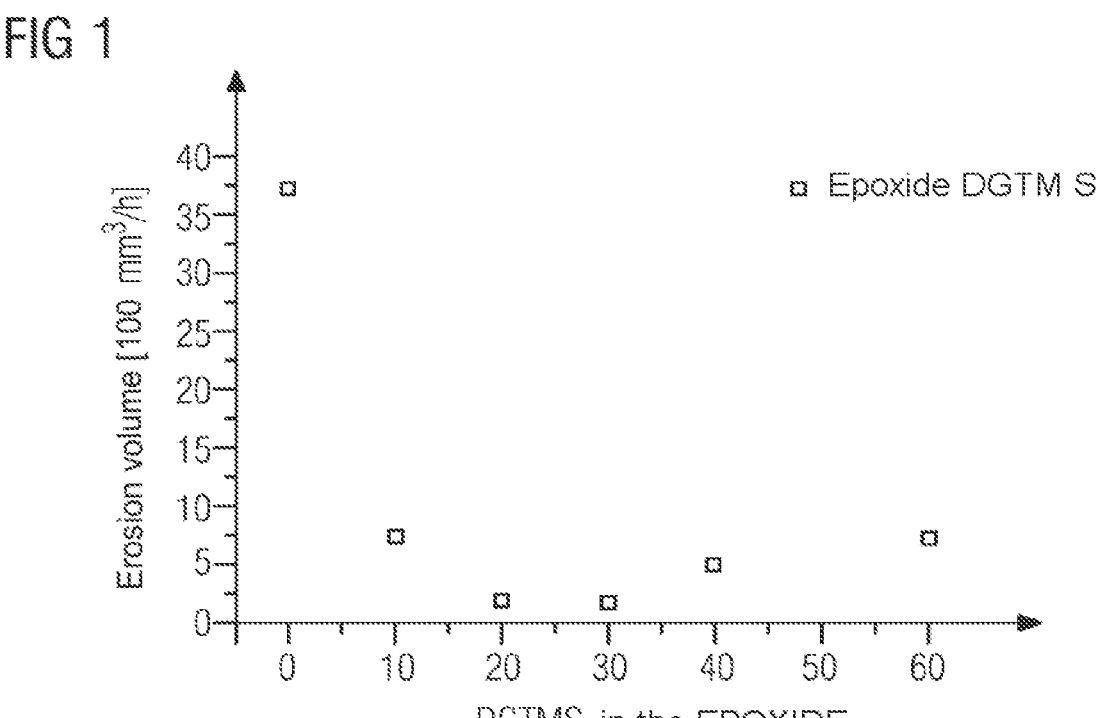
FIG. 1 shows the comparison of the erosion volumes after electrical exposure at 10 kV.

The present disclosure describes insulation materials and/or impregnation resins for a wrapping tape insulation, comprising at least a base resin, a curing agent and optionally additives, characterized in that at least some of the base resin that cures to give a thermoset for the insulation system is a siloxane-containing compound that forms a —SiR$_2$—O— backbone in the thermoset. Various embodiments may include insulation systems, for example an insulation system for a rotating electrical machine, especially a medium- or high-voltage machine, producible using the insulation material described herein.

"R" here represents all kinds of organic radicals suitable for curing and/or crosslinking to give an insulant usable for an insulation system. More particularly, R represents -aryl, -alkyl, -heterocycles, nitrogen-, oxygen- and/or sulfur-substituted aryls and/or alkyls.

More particularly, R may be the same or different and may represent the following groups:

alkyl, for example -methyl, -propyl, -isopropyl, -butyl, -isobutyl, -tert-butyl, -pentyl, -isopentyl, -cyclopentyl and all other analogs up to dodecyl, i.e. the homolog having 12 carbon atoms;

aryl, for example: benzyl-, benzoyl-, biphenyl-, tolyl-, xylenes etc., especially, for example, all aryl radicals whose structure meets Hückel's definition of aromaticity, heterocycles: especially sulfur-containing heterocycles such as thiophene, tetrahydrothiophene, 1,4-thioxane and homologs and/or derivatives thereof, oxygen-containing heterocycles, for example dioxanes nitrogen-containing heterocycles, for example —CN, —CNO, —CNS, —N3 (azide) etc.

sulfur-substituted aryls and/or alkyls: e.g. thiophene, but also thiols.

The Hückel rule for aromatic compounds relates to the correlation that planar, cyclically through-conjugated molecules comprising a number of Π electrons that can be represented in the form of 4n+2 possess exceptional stability which is also referred to as aromaticity.

In some embodiments, the resin comprises, as well as the component in monomeric and/or oligomeric form which has been functionalized for polymerization and has a —SiR$_2$—O— backbone, also at least one monomeric or oligomeric resin component that has been functionalized for polymerization and has a backbone comprising hydrocarbon units, i.e. (—CR$_2$—). Suitable examples for this purpose are epoxy-functionalized components such as bisphenol F diglycidyl ether (BFDGE) or bisphenol A diglycidyl ether (BADGE), polyurethane and mixtures thereof. Some embodiments include epoxy resins based on bisphenol F diglycidyl ether (BFDGE), bisphenol A diglycidyl ether (BADGE) or mixtures thereof.

In some embodiments, the monomeric or oligomeric component that has been functionalized for polymerization and has a —SiR$_2$—O— backbone is combined with one or more compounds selected from the group of the following compounds to give the base resin: undistilled and/or distilled, optionally reactively diluted bisphenol A diglycidyl ether, undistilled and/or distilled, optionally reactively diluted bisphenol F diglycidyl ether, hydrogenated bisphenol A diglycidyl ether and/or hydrogenated bisphenol F diglycidyl ether, pure and/or solvent-diluted epoxy novolak and/or epoxyphenol novolak, cycloaliphatic epoxy resins such as 3,4-epoxycyclohexylmethyl 3,4-epoxycyclohexylcarboxylate, e.g. CY179, ERL-4221; Celloxide 2021P, bis (3,4-epoxycyclohexylmethyl) adipate, e.g. ERL-4299; Celloxide 2081, vinylcyclohexene diepoxide, e.g. ERL-4206; Celloxide 2000, 2-(3,4-epoxycyclohexyl-5,5-spiro-3,4-epoxy)cyclohexanemeta-dioxane, e.g. ERL-4234; diglycidyl hexahydrophthalate, e.g. CY184, EPalloy 5200; tetrahydrophthalic acid diglycidyl ether, e.g. CY192; glycidated amino resins (N,N-diglycidyl-para-glycidyloxyaniline, e.g. MY0500, MY0510), N,N-diglycidyl-meta-glycidyloxyaniline, e.g. MY0600, MY0610, N,N,N',N'-tetraglycidyl-4,4'-methylenedianiline, e.g. MY720, MY721, MY725, and any mixtures of the aforementioned compounds.

In some embodiments, monomeric or oligomeric components have been functionalized for polymerization and have a —$SiR_2$—O— backbone are glycidyl-based and/or epoxy-terminated aryl- and/or alkylsiloxanes, for example glycidoxy-functionalized, especially glycidoxy-terminated, siloxanes. In some embodiments, there is a siloxane such as 1,3-bis(3-glycidyloxypropyl)tetramethyl-disiloxane, DGTMS or glycidoxy-terminated phenyldimethyl-siloxane in monomeric and/or oligomeric form, and in any desired mixtures and/or in the form of derivatives. It has been found that at least difunctionalized siloxane monomers usable for production of thermosets are suitable here.

In some embodiments, curing agents include cationic and anionic curing catalysts, for example organic salts, such as organic ammonium, sulfonium, iodonium, phosphonium and/or imidazolium salts, and amines such as tertiary amines, pyrazoles and/or imidazole compounds. Examples here include 4,5-dihydroxymethyl-2-phenyl-imidazole and/or 2-phenyl-4-methyl-5-hydroxymethylimidazole. It is alternatively possible to use compounds containing oxirane groups, for example glycidyl ethers, as curing agent.

Acid anhydrides are also conventionally used successfully as curing agent in the insulation materials. However, their toxicology has now become a matter of some controversy. In some embodiments, the carbon-based curing agent may be replaced even entirely or partly by siloxane-based curing agents having the same functionalities.

In some embodiments, the insulation material and/or impregnation resin for a wrapping tape insulation also includes additives such as sintering aids, reactive accelerators and/or fillers that may be present either as nanoparticles or as filler particles in the micrometer range. In some embodiments, in the insulant comprising the cured base resin, a ratio of —$SiR_2$—O— backbone to (—$CR_2$—) backbone such as 1:8 to 1:4 may be used, meaning that, in the insulation material in question, the hydrocarbon-based compounds are present in 4 to 8 times the quantity of the siloxane-based compounds. The proportions are based here on the stoichiometry, i.e. are molar percentages.

In some embodiments, the siloxane-containing component is thus present in an amount of 10 to 50 mol % in the base resin of the insulation material. In some embodiments, the amount of siloxane-containing component in the base resin is not more than 20 mol %, not more than 18 mol % and/or not more than 15 mol %. The partial discharge resistance of the insulant is increased quite sharply by the presence of a certain amount of monomers or oligomers that form $SiR_2$—O— in the base resin.

FIG. 1 shows the comparison of the erosion volumes after electrical exposure at 10 kV. Plotted on the x axis is the proportion of $SiR_2$—O-forming compound in the base resin; the baseline here is at 100% base resin that forms (—$CR_2$—) backbone. It is apparent that, between 0 and 10 mol % of "exchanged —$CR_2$— compound", the erosion volume plotted on the y axis drops abruptly from about 37 to 6. This means that the erosion volume here declines virtually by a factor of 9. In the case of 20 mol % of $SiR_2$—O-forming compound with 80 mol % of —$CR_2$— compound in the base resin, a minimum arises, which persists up to about 30 mol % of $SiR_2$—O-forming compound.

In the embodiment shown, the conventional resin component was exchanged for a —$SiR_2$—O-containing monomer by using 1,3-bis(3-glycidyloxypropyl)tetramethyldisiloxane. For the measurement, the cured insulant was exposed to electrical discharges in a controlled and defined manner. After a particular period of time, the volumes eroded were scanned by a laser and the eroded volume—or the erosion depth—was thus evaluated. The exposure parameters were as follows: temperature: room temperature; atmosphere: air, 50% RH; duration: 100 h; voltage: 10 kV.

In some embodiments, even in the case of low substitution of the conventional epoxy resin, such as of the bisphenol A diglycidyl ether (BADGE) for a —$SiR_2$—O-containing monomer, on completion of curing, a distinct increase in partial discharge resistance can be achieved, which results in a distinct reduction in volume eroded.

Figure 2:
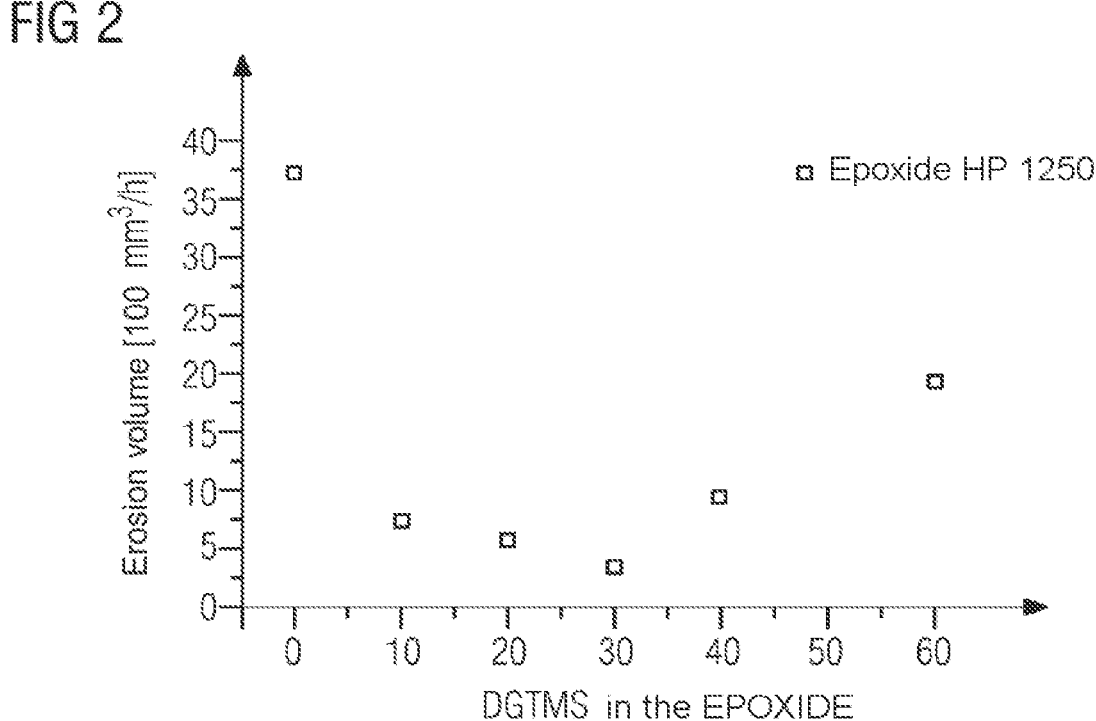
FIG. 2 shows a substitution of the bisphenol A diglycidyl ether (BADGE) for a SiR$_2$—O-containing product "Silres®" and/or Silikoftal with an at least difunctionalized, glycidoxy-terminated phenyldimethylsiloxane monomer.

The same phenomenon was observed in the case of substitution of the bisphenol A diglycidyl ether (BADGE) for a $SiR_2$—O-containing product "Silres®" and/or Silikoftal with an at least difunctionalized, glycidoxy-terminated phenyldimethylsiloxane monomer, as shown in FIG. 2.

In both figures, an optimum in the reduced erosion volume is apparent in the case of substitution of the compound that forms —$CR_2$— backbone of 20 mol % to 30 mol % for the compound that forms —$SiR_2$—O-containing backbone. However, the effect of the substitution of the compound that forms —$CR_2$— backbone in the cured insulant is a deterioration in the mechanical properties, and so there should be as little substitution as possible and as much as necessary.

In some embodiments, therefore, up to 10 mol %, up to 15 mol % and/or up to 20 mol % of the compound(s) in the base resin that form a —$CR_2$— backbone are substituted for correspondingly functionalized compounds that form a —$SiR_2$—O— backbone. Within this range, the mechanical properties of the cured insulant are indeed of comparable quality to those of the insulant without compounds that form a —$SiR_2$—O— backbone. More particularly, the resulting glass transition temperatures and the storage moduli of the substituted insulant are almost identical to those of the conventional insulant without substitutions.

Figure 3:
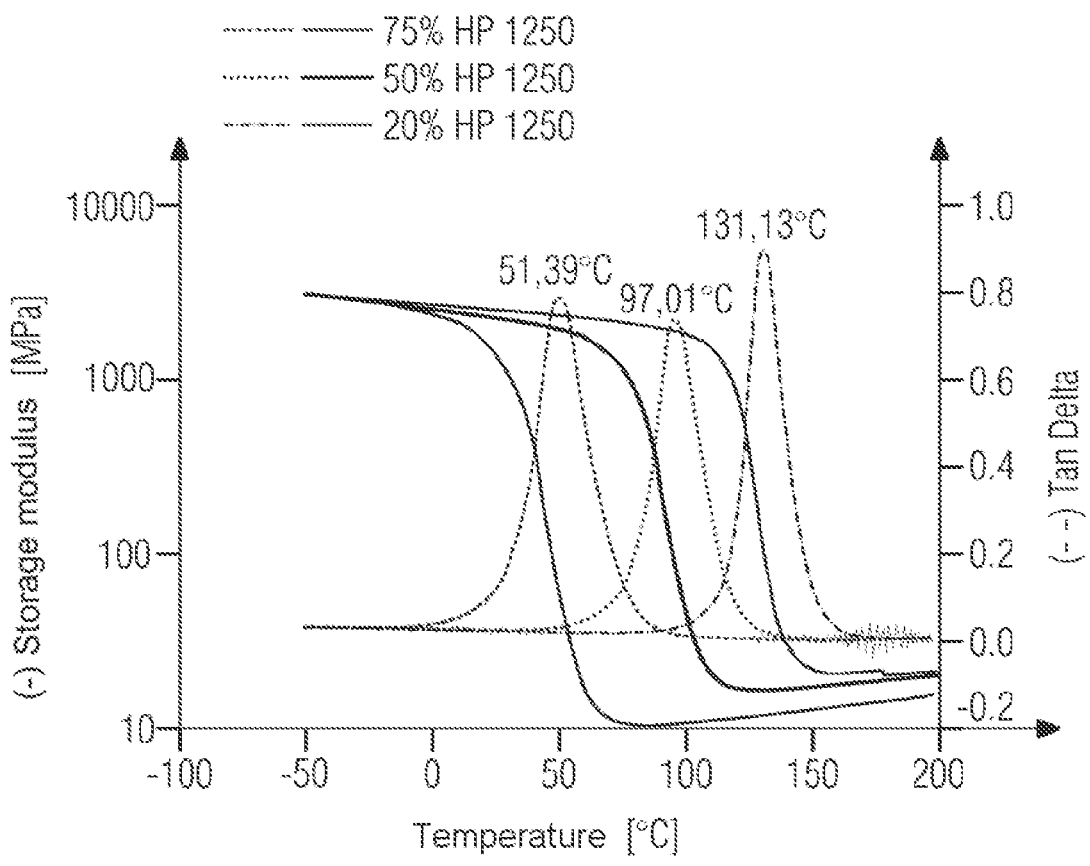
FIG. 3 shows the storage moduli and derived glass transition temperatures as a function of the degree of substitution of epoxy resin component for a compound that forms a —SiR$_2$—O— backbone, such as "Silres®".

FIG. 3 shows the storage moduli and derived glass transition temperatures as a function of the degree of substitution of epoxy resin component for a compound that forms a —$SiR_2$—O— backbone, such as "Silres®". It is apparent that the highest glass transition temperature is measured in the case of 25% substitution.

In some embodiments, an insulation material and/or impregnation resin for a wrapping tape insulation, by virtue of presence of compounds in the cured resin that form a —$SiR_2$—O— backbone, shows a distinct increase in partial discharge resistance. As a result, it is possible to drastically reduce the thickness of the insulation system, i.e., for example, by up to 20%. This results in various advantageous options for product development. It is firstly possible, in the case of conductors of the same thickness, to reduce the extent, weight and costs of the insulated conductors. Secondly, it is possible to fill the space saved with increased conductor thickness and hence increase the power per unit mass of the electrical machine.

At present, conventional insulation systems for high-voltage machines are designed to withstand sustained operating field strengths of 3.5 kV/mm for at least 20 years. With the insulation materials presented here, it would be possible to significantly increase these operating field strengths to up to 4.5 kV/mm for similarly long lifetimes.

What is claimed is:

1. An impregnation resin for insulation systems using a wrapping tape, the resin comprising:

a base resin including a siloxane-containing compound and a hydrocarbon-based compound; and a siloxane-based curing agent with cationic and anionic curing catalysts, the curing agent causing the base resin to cure to a thermoset material;

wherein the siloxane-containing compound forms a —$SiR_2$—O— backbone in the thermoset material;

the hydrocarbon-based compound forms a —$CR_2$— backbone in the thermoset material;

wherein R represents an organic radical selected from the group consisting of: aryls, heterocycles, nitrogen-substituted aryls or alkyls, oxygen-substituted aryls or alkyls, and sulfur-substituted aryls or alkyls; and the siloxane-containing compound makes up between 20 and 30 mol % of the base resin and the hydrocarbon-based compound makes up between 70 and 80 mol % of the base resin.

2. The impregnation resin as claimed in claim 1, wherein the siloxane-containing compound comprises a monomeric form.

3. The impregnation resin as claimed in claim 1, wherein the siloxane-containing compound comprises an oligomeric form.

4. The impregnation resin as claimed in claim 1, wherein the siloxane-containing compound comprises a glycidyl- and/or glycidoxy-functionalized compound.

5. The impregnation resin as claimed in claim 1, wherein the base resin comprises a glycidyl ether compound.

6. The impregnation resin as claimed in claim 1, wherein the base resin comprises a cycloaliphatic epoxy resin.

7. The impregnation resin as claimed in claim 1, wherein the siloxane-containing compound comprises an epoxy-terminated aryl- and/or alkylsiloxane.

8. The impregnation resin as claimed in claim 1, further comprising 1,3-bis(3-glycidyloxyalkyltetramethyldisiloxane).

9. The impregnation resin as claimed in claim 1, further comprising 1,3-bis(3-glycidyloxypropyl)tetramethyldisiloxane.

* * * * *